United States Patent [19]
Loeber

[11] Patent Number: 5,088,570
[45] Date of Patent: Feb. 18, 1992

[54] STEERABLE REAR DUAL AXLE SYSTEM FOR LARGE TRUCKS

[75] Inventor: Frederick W. Loeber, Tulsa, Okla.

[73] Assignee: Terex Corporation, Green Bay, Wis.

[21] Appl. No.: 650,442

[22] Filed: Feb. 4, 1991

[51] Int. Cl.⁵ .......................... B62D 61/10; B60G 5/02
[52] U.S. Cl. .................... 180/24.01; 280/81.5
[58] Field of Search .............. 280/81.1, 81.5, 86, 280/97, 125, 126, 136, 112.1, 113, 109, 110, 111, 120; 180/22, 24.01, 23

[56] References Cited

U.S. PATENT DOCUMENTS

| | | | |
|---|---|---|---|
| 2,373,398 | 4/1945 | Hoobler | 280/81.1 |
| 2,752,165 | 6/1956 | Compton | 280/104.5 |
| 2,985,251 | 5/1961 | Tellier | 280/81.1 |
| 3,051,506 | 8/1962 | Stump et al. | 280/81 |
| 3,254,901 | 6/1966 | Fisher et al. | 280/81.1 |
| 3,454,123 | 7/1969 | Lewis | 180/23 |
| 3,831,961 | 8/1974 | Peller | 280/81 |
| 3,831,962 | 8/1974 | Cator et al. | 280/81 |
| 3,831,963 | 8/1974 | Campbell et al. | 280/81 |
| 3,831,964 | 8/1974 | Campbell et al. | 280/81 |
| 3,903,979 | 9/1975 | Perrotin | 280/81.1 |
| 4,034,997 | 7/1977 | Oosterling et al. | 280/81 |
| 4,120,509 | 10/1978 | Reeve et al. | 280/81 |
| 4,629,211 | 12/1986 | Modglin et al. | 280/688 |
| 4,688,811 | 8/1987 | Knuutinen | 280/91 |

*Primary Examiner*—Kenneth R. Rice
*Assistant Examiner*—Tamara L. Finlay
*Attorney, Agent, or Firm*—Head and Johnson

[57] ABSTRACT

A steerable dual rear axle system for large trucks having a frame with steerable front wheels secured to the frame, a leading rear axle and a trailing rear axle spaced therefrom, a draft arm pivotally affixed to the leading rear axle and to the frame in the direction toward the frame front end, a structural salient having a forward end affixed to the leading rear axle and a rearward end pivotally attached at a point of pivotation to the trailing rear axle, spring support between the salient and the frame to transfer weight from the frame to the leading and trailing rear axles, and a steerage system for pivoting the trailing rear axle about a vertical axis through the point of pivotation with the salient member.

8 Claims, 3 Drawing Sheets

STEERABLE REAR DUAL AXLE SYSTEM FOR LARGE TRUCKS

SUMMARY OF THE INVENTION

This disclosure is a rear dual axle system for large trucks. In order to haul heavy loads, trucks are frequently required to have multiple axles. A common arrangement is to provide a truck having a forward and trailing rear axle, spaced apart from each other, each vertically displaceable in planes parallel to each other and in planes perpendicular to the longitudinal axis of the truck frame. Dual rear axles having such an arrangement function satisfactorily as long as the truck is traveling in a straight direction. When the truck turns, by steerable action of front wheels, it is not possible for the opposed wheels of both forward and trailing rear axles to precisely follow the turning radius. As a consequence, some scuffing of the tires on the dual rear axle system takes place each time a truck is turned. This scuffing action has two detrimental affects. First, it causes increase wear on tires. Second, it makes steering of the truck more difficult.

The steering difficulties and tire wear become much more pronounced as the load carried by the truck increases. Therefore, while dual axles of the customary arrangement are acceptable for a normal truck operation, that is, the excess wear on the tires is economically accepted and the increased difficulty of steering is tolerated, nevertheless, on trucks intended to carry very heavy loads on surfaces that are not usually ideal, problems develop.

The problem of steering heavy trucks with dual rear axles of the ordinary type is especially onerous when trucks need to be driven at fairly high rates of speed carrying heavy loads over surfaces that can become slick as a result of mud, sleet, snow, sand, gravel or the like. An even more difficult situation exists at slow speeds and during sharp turns when a truck is fully loaded. Scuffing induces unwanted loads into the truck structure making steering difficult.

It is therefore an object of the present disclosure to provide a dual rear axle system for large trucks having a forward and a trailing rear axle and in an arrangement wherein the trailing rear axle is steerable in conjunction with the truck steering system.

The rear steerable dual axle system for large trucks according to this disclosure includes a truck frame with a longitudinal axis in the direction of normal travel. The frame has a front end and a rearward end. A steerable front wheel system is secured to the frame to support the forward end of the frame and to provide steerage of the truck. This forward steerable front wheel system may include a single axle with steerable wheels mounted at opposed ends thereof or a dual steerable axle system with steerable wheels mounted at the opposed ends of both forward and trailing front axles.

The rear dual axle system includes a leading rear axle having an axis and opposed ends and a trailing rear axle having an axis and opposed end. A draft arm has one end pivotally affixed to the leading rear axle and another end pivotally affixed to the frame in the direction toward the frame front end.

A structural salient has a forward end affixed to the leading rear axle and a rearward end which is pivotally attached at a point of pivotation to the trailing rear axle. The point of pivotation of the trailing rear axle is in a vertical plane of the trailing rear axle and at a point intermediate the ends of the axle.

A suspension support system is provided between the salient and the truck frame to thereby transfer weight from the frame to the leading and trailing rear axles.

A panhard linkage is employed for maintaining the forward and trailing rear axles in proper position below the truck frame. The panhard linkage provides for free independent vertical displacement of the axles with respect to the frame.

A servo steering control system is connected to the trailing rear axle whereby the axle is pivoted about the attachment to the salient. The servo steering control system is operated in synchronization with the steerage system that controls the truck front steerable axle assembly. Thus, the rear axle system of this disclosure provides a system whereby dual rear axles are employed but without the scuffing and difficulty of steerage that is characteristic of usual dual rear axles supported in affixed vertical planes.

The dual rear axle system as encompassed herein has an improved suspension system wherein two vertically compressible strut members are employed for transferring weight from the frame equally to both the forward and rearward dual axles.

The axle assembly of this disclosure has a walking action that allows differential elevations and cross-slopes to be accomodated without imposing severe loads into the truck frame.

For reference to others which have provided systems including steerable rear axles and dual rear axle systems reference may be had to the following previously issued U.S. Pat. Nos. 2,752,165; 3,051,506; 3,454,123; 3,831,961; 3,831,962; 3,831,963; 3,831,964; 4,034,997; 4,120,509; 4,629,211 and 4,688,811.

A better understanding of the invention will be had by references to the following description and claims, taken in conjunction with the attached drawings.

DESCRIPTION OF THE DRAWINGS

In FIG. 2 the axles and wheels are aligned as the truck moves in a forward straight path. FIG. 3 shows the alignment of the wheels of the quad axle system during turning of the truck and showing the steerable rear dual axle system in operation.

DESCRIPTION OF THE PREFERRED EMBODIMENT

Figure 1:
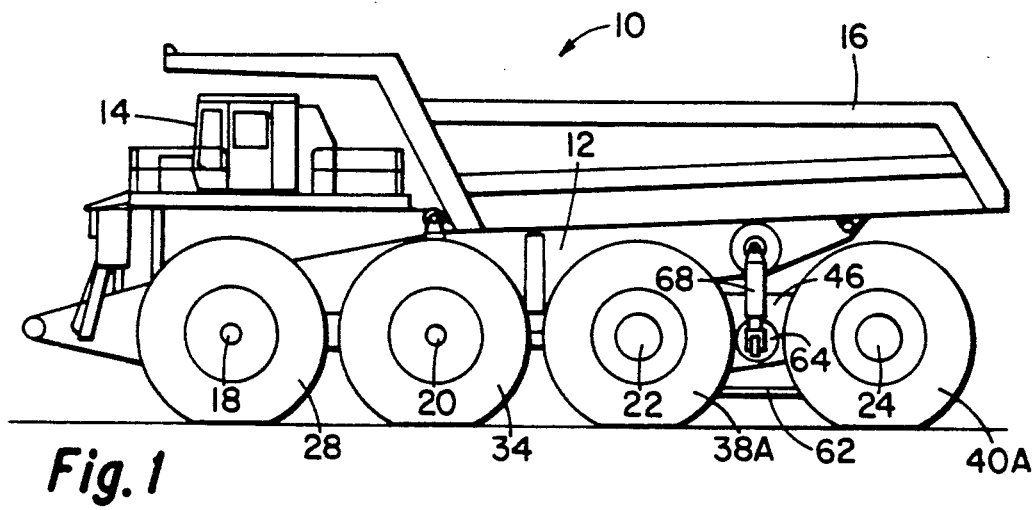
FIG. 1 is an elevational side view of a truck having a quad axle arrangement and having the steerable dual rear axle system of this disclosure.

Referring to the drawings and first to FIG. 1, an elevational side view of a typical truck that may employ the principles of this invention is shown. The truck, generally indicated by the numeral 10, has a frame 12 that supports a cab 14 in which the driver sits to operate the truck. The frame also supports a bed 16 that is typically pivotal so that the bed can be raised to dump loads therefrom. Truck 10 has four axles, as indicated by hubs 18, 20, 22 and 24. The axles represented by hubs 18 and 20 form a portion of a steerable dual front axle system that is not part of the present disclosure, but for reference to such a steerable dual axle system, see co-pending U.S. patent application entitled: "Dual Steerable Axle Arrangement For Large Vehicles" filed: Jan. 8, 1991 application Ser. No. 07/638,690.

Figure 2:
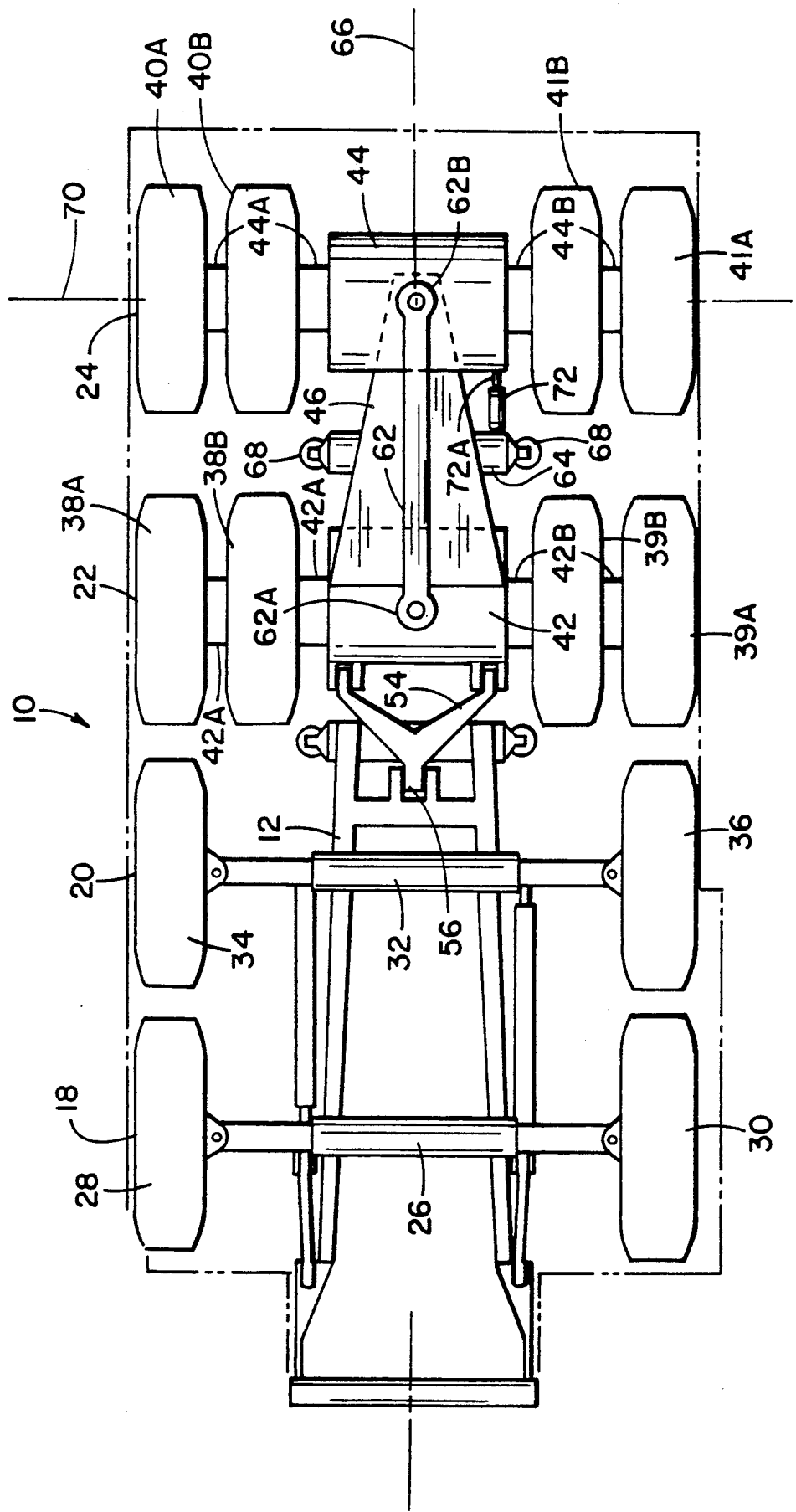
FIG. 2 is a bottom view, enlarged, of the truck of FIG. 1 showing a quad axle arrangement in which the truck has two front axles and two rear axles. Motive force for movement of the truck is provided at the rear axle system. The dual rear axle system is steerable.

The axles indicated by hubs 22 and 24 form a steerable rear dual axle system for truck 10 which is the subject of this disclosure. Referring to FIG. 2, a bottom view of the truck of FIG. 1, more details of the steerable rear dual axle system will be seen. Portions of truck frame 12 are shown, but most of the frame is not shown to more clearly reveal the superstructure that forms the steerable rear dual axle system. Front axle 26 supports front wheels 28 and 30, wheel 28 having hub 18 as seen in FIG. 1. A trailing front axle 32 supports wheels 34 and 36, wheel 34 having hub 20 as shown in FIG. 1. The front dual steerable axle system made up of axles 26 and 32 and wheels 28, 30, 34 and 36 form a front steerable system that, as previously indicated, does not form a part of the present disclosure but is representative of any system of a truck having a front steerable system. This front steerable system can be formed of a single axle with steerable wheels thereon or a dual axle front steerable system as illustrated.

The present disclosure is concerned with the steerable rear dual axle system that supports four pairs of dual wheels, specifically wheels 38A and 38B, wheel 38A supporting hub 22 of FIG. 1, and wheels 39A and 39B, 40A and 40B, and 41A and 41B. Wheels 38A, 38B, 39A and 39B are all supported on an axle formed in part by a large diameter tubular member 42. The tubular axle member 42 has extension portions 42A and 42B that support wheels 38A, 38B, 39A and 39B. Thus, the tubular axle member 42 with the extensions 42A and 42B together form a forward rear axle portion of the steerable rear dual axle assembly.

A second tubular axle member 44 with the axle extensions 44A and 44B together form the trailing axle of the steerable rear dual axle system and supports wheels 40A, 40B, 41A and 41B.

Figure 4:
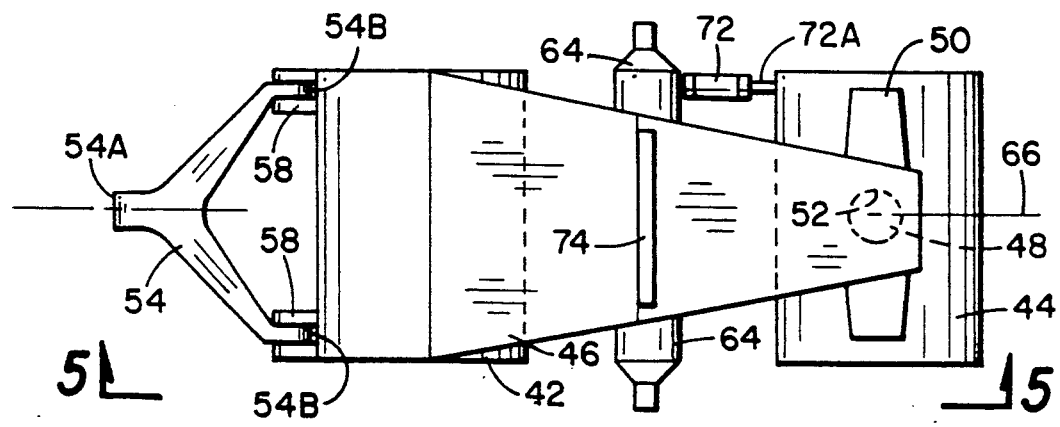
FIG. 4 is a top view of the superstructure of the steerable rear dual axle system as shown in FIGS. 2 and 3.
Figure 5:
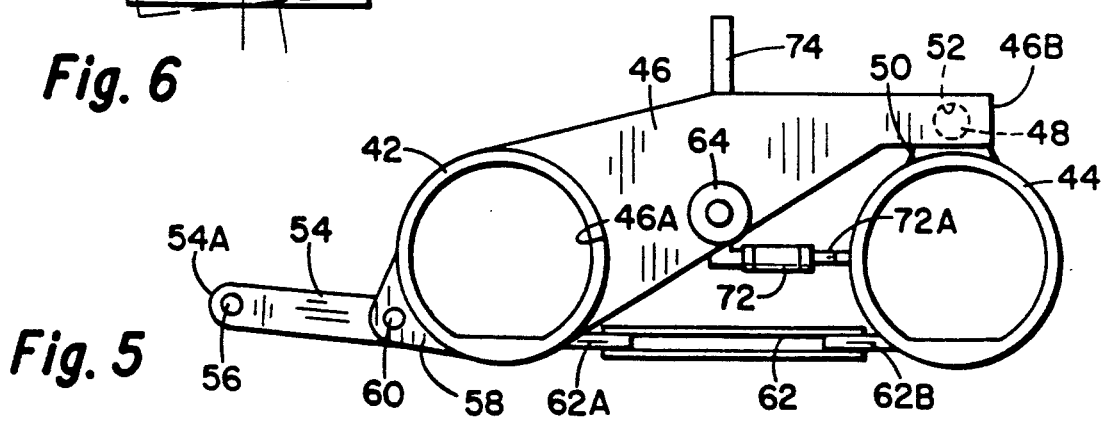
FIG. 5 is an elevational view taken along the line 5—5 of FIG. 4 of the structural components forming the steerable rear dual axle system.

The tubular axle members 42 and 44 form a part of a structural system that is the essence of the steerable rear dual axle system of this disclosure, and such system is illustrated in more detail in FIGS. 4 and 5.

Tubular axle members 42 and 44 are enlarged diameter tubular members that support drive systems. Such drive systems typically house electrical, hydraulic or mechanical drive systems. A typical drive system for large heavy load carrying trucks utilizes electrical energy, in which case the large diameter tubular axle members 42 and 44 house electric motors with gear reduction systems and with axle portions 42A, 42B, 44A and 44B respectfully extending therefrom. The details of the electric drive systems and the axles extending from the large diameter tubular axle members 42 and 44 are not shown since such are standard components frequently utilized with large heavy load carrying trucks and are well known to those skilled in the art.

As shown in FIGS. 4 and 5 there is affixed to and extending from the forward tubular axle member 42 a large structural salient 46 that is typically fabricated of heavy sheet steel and welded to the required configuration. Salient 46 has a forward end 46A that is integrally affixed, such as by welding, to forward tubular axle member 42. The salient has a rear end 46B that extends over trailing tubular axle member 44. The rearward end 46B of salient 46 is pivotally attached to trailing tubular axle member 44, the pivotal attachment being indicated by ball joint 48. Such ball joint may be like a typical trailer hitch, wherein a trunnion member 50 extends upwardly from the top of trailing tubular axle member 44 and has ball 48 thereon. Salient rearward end portion 46B has a semi-spherical ball receiving portion 52 that rotatably receives ball 48. Thus, trailing tubular axle member 44 is pivotally secured to the rearward end of salient 46 permitting the trailing tubular axle member to pivot in both vertical and horizontal planes with respect to salient 46.

To secure the superstructure system of FIGS. 4 and 5 to truck frame 12, a draft arm 54 is employed, as illustrated in FIGS. 2, 3, 4 and 5. The draft arm forward end 54A is pivotally affixed to truck frame 12, as shown in FIG. 2, the spherical pivotal interconnection being indicated by the numeral 56. The spherical pivotal connection 56 is of the type that permits draft arm rearward end 54B to pivot in a vertical plane with the limited capability of pivoting in the roll mode.

The draft arm rearward ends 54B is pivotally connected to forward tubular axle member 42 by the use of trunnions 58 extending from forward tubular axle member 42. Pins 60 (only one of which is seen in FIG. 5) pivotally connects the draft arm 54 to the forward tubular axle member 42.

Figure 3:
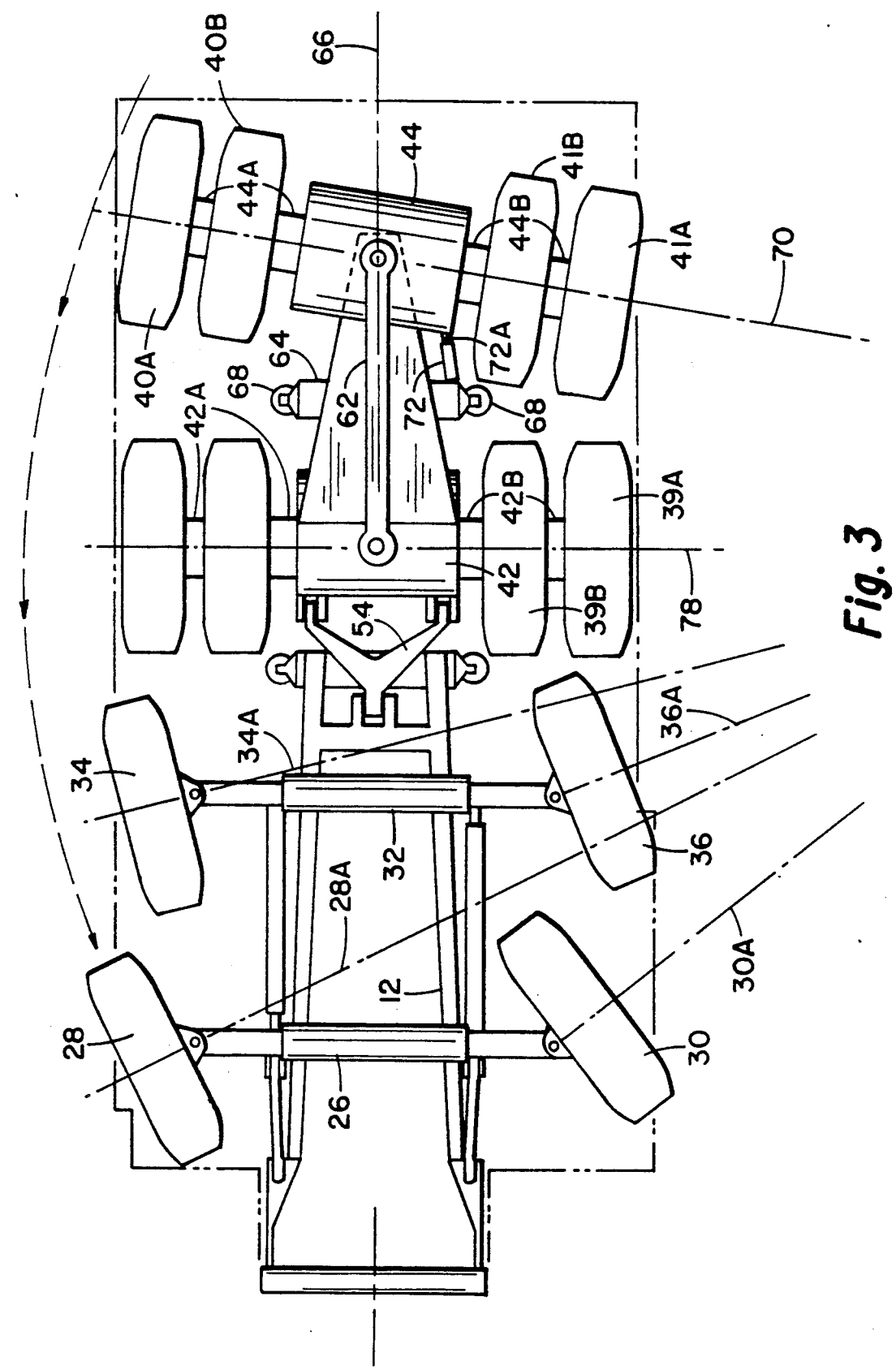
FIG. 3 is a bottom view as in FIG. 2.

To further interconnect forward tubular axle member 42 with trailing tubular axle member 44 a tie rod 62 is employed (see FIGS. 2, 3 and 5). The tie rod has a forward end 62A that is pivotally connected to forward tubular axle member 42 at the lower portion thereof and midway between its ends and in like arrangement, the tie rod has a rearward end 62B connected to the lower portion of trailing tubular axle member 44 midway between its ends. The connection of tie rod 62 to tubular axle members 42 and 44 is pivotal so as to allow the axle members to freely pivot in vertical and horizontal planes relative to each other, but tie rod 62 maintains constant spacing of the center point of the lower portions of the tubular axle members.

Affixed to salient 46 and extending laterally from each side thereof is a suspension mount 64. The suspension mount 64 extends in a generally horizontal plane and in a vertical plane that is perpendicular to the truck frame longitudinal axis 66 of salient 46. Spring support is provided between salient 46 and truck frame 12. This can be achieved in a variety of ways. In a preferred arrangement, telescopically compressible strut members 68 are employed, one of which is seen in FIG. 1 and indicated in FIGS. 2 and 3. The telescopic strut members provide resilient spring compression, such as achieved by gas filled cylinders, so that weight carried by frame 12 is transmitted to the steerable rear dual axle system by transfer of such weight to salient 46. Stating this another way, in the system illustrated, a portion of the weight born by frame 12 is transmitted to salient 46 by two telescopic strut members 68, and such weight is thereby transferred to dual axles 42 and 44. This arrangement ensures that the weight transmitted to the steerable rear dual axle system is equally distributed to all of the wheels making up the system, that is, wheels 38A, 38B, 39A, 39B, 40A, 40B, 41A, and 41B.

An important feature of the rear axle system is that it is steerable. Since trailing axle member 44 is pivotally supported to salient 46, pivotation can be achieved by changing the angle of the vertical plane of the axis 70 of axle 44 with respect to the vertical plane of the truck frame longitudinal axis 66. This is achieved by pivoting the trailing axle 44 about the pivots provided by ball joint 48 and the pivotal connection of tie rod end 62B to trailing tubular axle member 44. Such pivotation can be achieved by means of a hydraulically actuated cylinder and piston 72, 72A as seen in FIGS. 2, 3, 4 and 5. As seen in FIG. 5 the cylinder portion 72 is affixed to salient 46 while the piston portion 72A is pivotally affixed to trailing tubular axle member 44.

Figure 6:
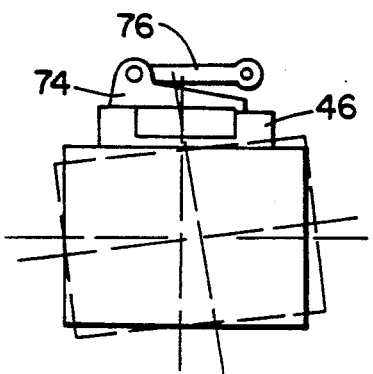
FIG. 6 is a fragmentary view of one of the axle housings showing the use of a panhard bar as employed for maintaining the system in proper location below the truck frame while permitting free pivotation and vertical displacement of the rear dual axles.

To maintain the system in proper position below truck frame 12 an additional element is required, illustrated in FIG. 6. Affixed to the upper surface of salient 46 is a boss member 74. Pivotally extending from boss member 74 in connection with truck frame 12 is a panhard bar 76. The panhard bar is in a vertical plane perpendicular to the truck frame longitudinal axis 66. Panhard bar 76 permits salient 46 to be displaced vertically relative to truck frame 12, which takes place as spring action provided by telescopic strut members 68. At the same time, panhard bar 76 allows pivotation of salient 46 with respect to frame 12. The combination of draft arm 54 and panhard bar 76 maintains the steerable rear dual axle system in proper position below the truck frame to provide motive power to propel the frame and thereby the truck over ground surface while, at the same time, permitting free spring action of the frame relative to the dual axle system.

FIG. 3 is an illustration of the function of the steerable rear dual axle system that has been described. FIG. 3 is a bottom view of the truck having, as previously described, a quad axle system in which the wheels affixed to two forward axles are steerable. Forward rear axle 42 is not steerable, that is, axis 78 of forward rear axle 42 remains in an affixed vertical plane perpendicular to the truck frame longitudinal axis 66, while the axis 70 of trailing axle member 44 can pivot in a vertical plane relative to the truck frame longitudinal axis 66.

FIG. 3 shows front wheel 28 having an axis 28A; front wheel 30 an axis 30A; front wheel 34 an axis 34A, and front wheel 36 an axis 36A. In driving a truck having the steerable rear dual axle system as disclosed herein, the pivotation of trailing rear axle 44 to change axis 70 is coordinated and interrelated with the driving action that changes axes 28A, 30A, 34A, and 36A of the steerable front wheels. If the front wheels are steered with hydraulic applied power, such hydraulic system can be coupled to the cylinder/piston 72 to achieve the steering action desired. As shown in FIG. 3, in order to achieve proper steering the pivotation of trailing rear axle 44 is opposite to the direction of pivotation of the forward driving wheels, that is, as illustrated in FIG. 3, when the truck is shown as making a turn to the right, the front wheels are pivoted in a counterclockwise direction as viewed from below, while trailing rear axle 44 is pivoted in a clockwise direction as viewed from below.

Following the Ackerman principle of vehicle steerage axes 30A, 28A, 36A and 34A converge to a center of rotation lying along axis 78. From this point the vehicular turning radius is measured. Axis 70 is aimed to fall on this same point, within limitations determined by design and space allocation. The total vehicular turning radius is a minimum if axis 78 is in close proximity with 34A. Axis 78 is fixed in position to the frame. Steering is achieved with the assistance of trailing axle 44.

The steerable rear dual axle system herein described has advantages over presently known systems. First, by providing a dual rear axle system wherein motive power is supplied to two separate axles increased traction is attained compared to a single rear drive system. At the same time, since the dual rear axle drive system also provides a steerable arrangement, steering of the truck is substantially improved. It can be easily seen that on a truck wherein a dual non-steerable rear axle drive systems is employed scuffing of the tires during turning is an unescapable result. Such scuffing during turning is alleviated by the steerable rear dual axle system of this disclosure. In addition, improved means of equal distribution of a load to the dual rear axle system is provided while maintaining free and independent pivotation of the forward and the trailing rear axles relative to each other for improved load distribution.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A steerable real dual axle system for large trucks, comprising:
    a frame with a longitudinal axis in the direction of normal travel, the frame having a front end and a rear end,
    steerable front wheel means secured to said frame;
    a leading rear axle having a bottom, an axis and opposed ends;
    a trailing rear axle having a bottom, an axis and opposed ends;
    a draft arm having one end pivotally affixed to said leading rear axle and having another end pivotally affixed to said frame in the direction toward said frame front end;
    a salient having a forward end affixed to said leading rear axle and a rearward end pivotally attached at a point of pivotation to said trailing rear axle;
    means providing spring support between said salient and said frame to thereby transfer weight from said frame to said leading and trailing rear axles;

means retaining said axis of said leading rear axle in a vertical plane perpendicular to said frame longitudinal axis; and means of steerably pivoting said trailing rear axle about a vertical axis through said point of pivotation of said salient rearward end.

2. An steerable rear dual axle system for large trucks according to claim 1 wherein said leading rear axle and said trailing rear axle are both in the form of tubular members and wherein said point of pivotation of said salient member rearward end to said trailing rear axle is on top of the tubular trailing rear axle; and a tie rod having a forward end pivotally affixed to said tubular leading rear axle at a point adjacent the bottom and intermediate the opposed ends of said leading rear axle, and having a rearward end pivotally affixed to said tubular trailing rear axle at a point adjacent the bottom and intermediate the opposed ends of said trailing rear axle.

3. A steerable rear dual axle system for large trucks according to claim 1 wherein said means of steerably pivoting said trailing rear axle includes hydraulic cylinder and piston having first and second ends, the first end being pivotally connected to said salient and the second end being pivotally connected to said trailing rear axle at a point adjacent one end of said opposed ends of said trailing rear axle.

4. A steerable rear dual axle system for large trucks according to claim 3 wherein said cylinder and piston first end is pivotally connected to said leading rear axle at a point adjacent one end of said opposed ends of said leading rear axle.

5. A steerable rear dual axle system for large trucks according to claim 1 wherein said means of steerably pivoting said trailing rear axle includes servo control means coordinated with said steerable front wheel means.

6. A steerable rear dual axle system for large trucks recording to claim 1 wherein said means to provide spring support between said salient and said frame includes:

a lateral suspension mount having opposed ends, said lateral suspension mount affixed to said salient having a longitudinal axis in a vertical plane perpendicular to said truck frame longitudinal axis; and spring support means interposed between said opposed ends of said lateral suspension mount and said frame.

7. A steerable rear dual axle system for large trucks according to claim 6 wherein said spring support means is in the form of a telescopically compressible strut member.

8. A steerable rear dual axle system for large trucks according to claim 1 including:

an elongated panhard bar having first and second ends, the first end being pivotally connected to said salient at a point thereon intermediate said leading and trailing rear axles, the second end being pivotally connected to said frame, said panhard bar being supported for pivotation in a vertical plane perpendicular to said frame longitudinal axis and serving to maintain said leading and trailing axles in vertical position below said frame.

* * * * *